US012626391B2

(12) United States Patent
Takatsu et al.

(10) Patent No.: US 12,626,391 B2
(45) Date of Patent: May 12, 2026

(54) DEVICE DETERMINATION SYSTEM, DEVICE DETERMINATION METHOD, AND DEVICE DETERMINATION PROGRAM

(71) Applicant: AMADA CO., LTD., Kanagawa (JP)

(72) Inventors: Satoshi Takatsu, Kanagawa (JP); Teruyuki Kubota, Kanagawa (JP); Kai Shimura, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 293 days.

(21) Appl. No.: 18/274,261

(22) PCT Filed: Jan. 20, 2022

(86) PCT No.: PCT/JP2022/001958

§ 371 (c)(1),
(2) Date: Jul. 26, 2023

(87) PCT Pub. No.: WO2022/168616

PCT Pub. Date: Aug. 11, 2022

(65) Prior Publication Data

US 2024/0095943 A1     Mar. 21, 2024

(30) Foreign Application Priority Data

Feb. 5, 2021     (JP) ................................. 2021-017709

(51) Int. Cl.
G06K 9/00          (2022.01)
G06T 7/70          (2017.01)
(52) U.S. Cl.
CPC ...... G06T 7/70 (2017.01); G06T 2207/30164 (2013.01)
(58) Field of Classification Search
CPC ........................ G06T 2207/30164; G06T 7/70
See application file for complete search history.

(56) References Cited

U.S. PATENT DOCUMENTS 8,224,024 B2 * 7/2012 Foxlin ....................... G06T 7/73
348/169
10,272,828 B2 * 4/2019 White ................... A47L 9/2826
(Continued)

FOREIGN PATENT DOCUMENTS

JP          2003-329448 A      11/2003
JP          2008-046749 A       2/2008
(Continued)

OTHER PUBLICATIONS

Extended European Search Report for corresponding EP Application No. 22749492.9 dated Jun. 13, 2024.
(Continued)

*Primary Examiner* — Hadi Akhavannik
(74) *Attorney, Agent, or Firm* — Renner, Otto, Boisselle & Sklar, LLP

(57) ABSTRACT

A device determination system includes an assistance device configured to assist a work for a workpiece stacked in a stacking area and having portability so as to be freely arranged, an image capturing device capable of capturing an image of the stacking area, and a control device configured to determine an arrangement position and an arrangement orientation of the assistance device in the stacking area based on the captured image captured by the image capturing device, in which the assistance device includes an indicator by which a position and an orientation of the assistance device reflected in the captured image can be identified, and the control device detects the indicator included in the captured image so as to determine the arrangement position and the arrangement orientation.

18 Claims, 6 Drawing Sheets

(56) References Cited

U.S. PATENT DOCUMENTS

| | | | | |
|---|---|---|---|---|
| 10,671,088 | B2 | 6/2020 | Lutz et al. | |
| 2003/0088337 | A1* | 5/2003 | Watanabe | G06T 7/74 |
| | | | | 700/259 |
| 2015/0224647 | A1* | 8/2015 | Dumora | B25J 9/1679 |
| | | | | 700/245 |
| 2017/0248966 | A1* | 8/2017 | Lutz | B25J 9/1697 |
| 2018/0050634 | A1* | 2/2018 | White | A47L 7/0085 |
| 2019/0069962 | A1* | 3/2019 | Tabandeh | A61B 90/39 |
| 2019/0329409 | A1* | 10/2019 | Yamada | B25J 9/1661 |
| 2020/0210700 | A1* | 7/2020 | Oka | B25J 9/1661 |
| 2020/0316782 | A1* | 10/2020 | Chavez | B25J 9/1697 |
| 2022/0335642 | A1 | 10/2022 | Kubota et al. | |

FOREIGN PATENT DOCUMENTS

| | | | |
|---|---|---|---|
| JP | 2011-035663 | A | 2/2011 |
| JP | 2016-209995 | A | 12/2016 |
| JP | 2017-149496 | A | 8/2017 |
| JP | 2018-120388 | A | 8/2018 |
| WO | 2020/205837 | A1 | 10/2020 |
| WO | 2020/250761 | A1 | 12/2020 |

OTHER PUBLICATIONS

International Search Report for corresponding Application No. PCT/JP2022/001958, mailed Mar. 8, 2022.
Written Opinion for corresponding Application No. PCT/JP2022/001958, mailed Mar. 8, 2022.

* cited by examiner

DEVICE DETERMINATION SYSTEM, DEVICE DETERMINATION METHOD, AND DEVICE DETERMINATION PROGRAM

TECHNICAL FIELD

The present invention relates to a device determination system, a device determination method, and a device determination program.

BACKGROUND ART

Conventionally, a plurality of workpieces such as plate materials stacked in a stacking area are supplied, by a loading machine such as a supply robot, to a working machine such as a press brake that carries out a bending process and the like. Then, a workpiece lifting device (a single-sheet lifter), such as a magnet floater that separates a workpiece from other workpieces by floating the workpiece by a magnetic force and or an air separator (for example, see Patent Literature 1) that separates a workpiece from other workpieces by an injection pressure of an air, is used for loading, for example.

CITATION LIST

Patent Literature

Patent Literature 1: Japanese Patent Application Laid-Open Publication No. 2017-149496

SUMMARY

Technical Problem

Typically, the workpiece lifting device of the prior art including the air separator described in Patent Literature 1 is provided in a fixed state to an arrangement table arranged at a position adjacent to the stacking area. Therefore, the plurality of workpieces stacked in the stacking area placed at one location, and one workpiece lifting device corresponding to these workpieces is arranged. However, there has been a market demand to eliminate a dead space and carry out the loading efficiently, if the stacking area is wide, by arranging the plurality of workpieces of different types at a plurality of locations in the stacking area and arranging a plurality of the workpiece lifting devices corresponding to these workpieces.

The present invention has been made in view of the above circumstance, and it is an object of the present invention to provide a device determination system, a device determination method, and a device determination program capable of accurately determining an arrangement position and an arrangement orientation of an assistance device, such as a workpiece lifting device, which is configured to assist a work for a workpiece stacked in a stacking area and has portability so as to be freely arranged.

Solution to Problem

A device determination system according to the present invention includes an assistance device configured to assist a work for a workpiece stacked in a stacking area and having portability so as to be freely arranged, an image capturing device capable of capturing an image of the stacking area, and a control device configured to determine an arrangement position and an arrangement orientation of the assistance device in the stacking area based on the captured image captured by the image capturing device, in which the assistance device includes an indicator by which a position and an orientation of the assistance device reflected in the captured image can be identified, and the control device detects the indicator included in the captured image so as to determine the arrangement position and the arrangement orientation.

In an embodiment of the present invention, the control device compares the detected indicator with an indicator indicated by an indicator model image stored in advance so as to determine the arrangement position and the arrangement orientation.

In another embodiment of the present invention, the assistance device includes a device main body including a top surface part, and the indicator is provided on at least the top surface part of the device main body.

In still another embodiment of the present invention, the assistance device includes, on the device main body, an inclined surface part inclined from the top surface part, and the indicator is provided on the inclined surface part of the device main body.

In still another embodiment of the present invention, the indicator provided on the inclined surface part is provided at a location most distant from the top surface part.

In still another embodiment of the present invention, the indicator provided on the top surface part is larger than the indicator provided on the inclined surface part.

In still another embodiment of the present invention, the assistance device includes, on the device main body, a pair of side surface parts connected to the top surface part, and the indicator is provided on each of the pair of side surface parts of the device main body.

In still another embodiment of the present invention, the indicator has a light transmitting property, and the assistance device is provided with a light source inside the device main body.

In still another embodiment of the present invention, a plurality of the assistance devices are provided, and the control device determines an arrangement status including the arrangement position and the arrangement orientation of each of the assistance devices in the stacking area, which are determined based on the detected indicator.

In still another embodiment of the present invention, the control device detects the workpiece in the stacking area based on the captured image, and specifies the assistance device to be operated for the workpiece based on a determination result of the arrangement status.

In still another embodiment of the present invention, there is provided detecting means capable of detecting the assistance device stored in a storage area provided at a location distant from the stacking area, and the control device determines a storage status of the assistance device in the storage area based on a detection result from the detecting means.

In still another embodiment of the present invention, there is provided issuing means capable of issuing a predetermined alarm, and the control device controls the issuing means to issue the predetermined alarm based on a determination result of the arrangement status and/or the storage status.

A device determination method according to the present invention includes capturing, by an image capturing device, an image of a stacking area provided with an assistance device configured to assist a work for a workpiece stacked in the stacking area and having portability so as to be freely arranged, and determining, by a control device, an arrangement position and an arrangement orientation of the assistance device in the stacking area based on the captured image captured by the image capturing device, in which in the determining, an indicator by which a position and an orientation of the assistance device reflected in the captured image can be identified is detected from the captured image so as to determine the arrangement position and the arrangement orientation.

In an embodiment of the present invention, in the image capturing, an image of the stacking area in which a plurality of the assistance devices are arranged is captured, and in the determining, an arrangement status including the arrangement position and the arrangement orientation of each of the assistance devices in the stacking area, which are determined based on the detected indicator, is determined.

In another embodiment of the present invention, there is provided detecting, by the control device, the workpiece in the stacking area based on the captured image so as to specify the assistance device to be operated for the workpiece based on a determination result of the arrangement status.

In still another embodiment of the present invention, there are provided detecting, by detecting means, the assistance device stored in a storage area provided at a location distant from the stacking area, and determining, by the control device, a storage status of the assistance device in the storage area based on a detection result from the detecting means.

In still another embodiment of the present invention, there is provided issuing a predetermined alarm by controlling issuing means capable of issuing the predetermined alarm with the control device based on a determination result of the arrangement status and/or the storage status.

A device determination program according to the present invention is the device determination program for causing a computer to execute acquiring a captured image obtained by capturing, with an image capturing device, an image of a stacking area provided with an assistance device configured to assist a work for a workpiece stacked in the stacking area and having portability so as be freely arranged, and determining an arrangement position and an arrangement orientation of the assistance device in the stacking area based on the captured image that is acquired, in which in the determining, an indicator by which a position and an orientation of the assistance device reflected in the captured image can be identified is detected from the captured image so that the arrangement position and the arrangement orientation are determined.

Advantageous Effect of Invention

According to the present invention, it is possible to accurately determine an arrangement position and an arrangement orientation of an assistance device such as a workpiece lifting device configured to assist a work for a workpiece stacked in a stacking area and having portability so as to be freely arranged.

DESCRIPTION OF EMBODIMENT

Hereinafter, a device determination system, a device determination method, and a device determination program according to the embodiment of the present invention will be described in detail with reference to the accompanying drawings. However, the following embodiment does not limit the invention according to each claim, and all of the combinations of features described in the embodiment are not necessarily essential to the solution of the invention. Note that in the present embodiment, the scale and dimensions of each component may be exaggerated, and some components may be omitted.

Figure 1:
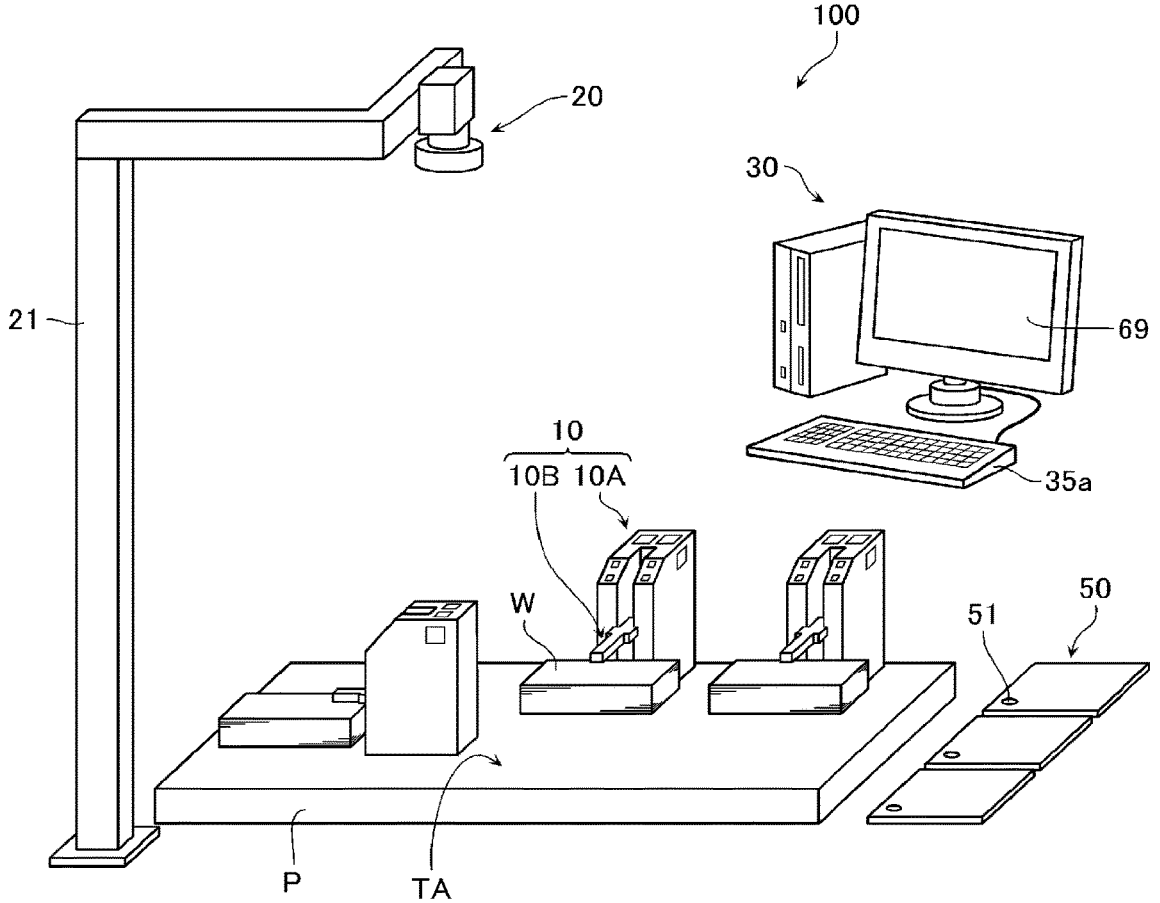
FIG. 1 is a perspective view schematically showing a configuration example of a device determination system according to an embodiment of the present invention.

FIG. 1 is a perspective view schematically showing a configuration example of a device determination system 100 according to an embodiment of the present invention. As shown in FIG. 1, the device determination system 100 according to the present embodiment includes a workpiece lifting device 10 as an assistance device that assists a work (for example, loading to a bending machine or the like) for a workpiece W stacked in a stacking area TA on a pallet P, and a camera 20 as an image capturing device capable of capturing an image of the stacking area TA.

Further, the device determination system 100 includes a function such as an NC device that controls the entire device determination system 100, and a function of an image processing device that carries out overall image processing such as image analysis and image correction based on the captured image captured by the camera 20. The device determination system 100 includes a control device 30 that determines an arrangement position and an arrangement orientation of the workpiece lifting device 10 in the stacking area TA.

Note that in the present embodiment, the control device 30 is configured to include a display 69 as a display device and an input unit 35a composed of an input device such as a keyboard and a mouse. However, the configuration of the control device 30 is not limited to this, and any configuration is possible as long as equivalent functions can be provided in lieu of the display 69 and the input unit 35a (for example, displaying means and inputting means that can be used remotely).

Further, in the present embodiment, for example, illustrations of a working machine such as the bending machine and a loading machine such as a workpiece holding robot will be omitted, but the working machine, the loading machine, and the like may be included in the device determination system 100 in a state of being controllable by the control device 30.

Further, in the present embodiment, a storage area 50 is provided at a location distant from the stacking area TA on the pallet P so as to store a required number of the workpiece lifting devices 10 corresponding to the workpiece W stacked in the stacking area TA. Then, the storage area 50 includes storage sensors 51 for individually detecting the stored workpiece lifting devices 10. The control device 30 can determine a storage status of the workpiece lifting device 10 in the storage area 50 based on a signal from the storage sensor 51.

Further, in the present embodiment, the workpiece lifting device 10 will be described as an example of the assistance device, but the assistance device is not limited to this. It is possible to use any assistance device as long as it can assist various works for the workpiece W. Furthermore, although not shown, the respective workpiece lifting devices 10, the camera 20, and the control device 30 are respectively connected by wire or wirelessly in such a manner as to be able to transmit and receive data and a signal to each other.

The workpiece lifting devices 10 have portability so as to be freely arranged, and can be freely arranged at a plurality of locations inside and outside of the stacking area TA so as to correspond to a plurality of the workpieces W arranged in the stacking area TA on the pallet P. In the present embodiment, the plurality of the workpiece lifting devices 10 can be arranged in the stacking area TA so as to correspond to the respective workpieces W, for example, in a one-to-one manner.

Figure 2:
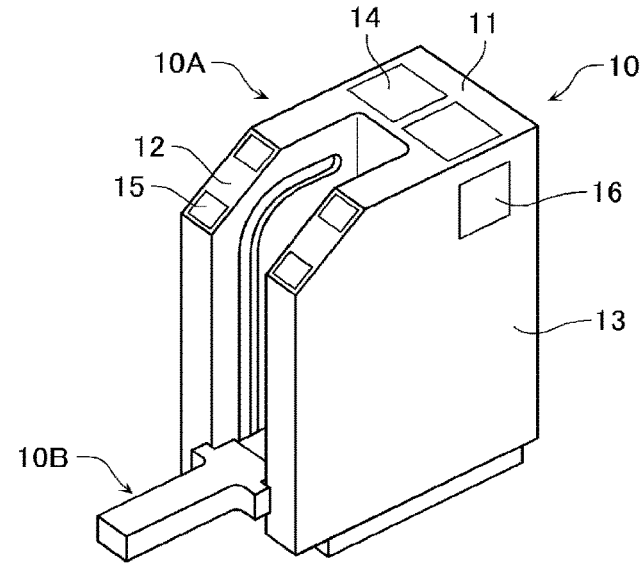
FIG. 2 is a perspective view schematically showing an assistance device in the device determination system.

FIG. 2 is a perspective view schematically showing the workpiece lifting device 10 in the device determination system 100. As shown in FIG. 2, the workpiece lifting device 10 includes a device main body 10A having a rectangular outer shape when viewed from above, and a lifting unit 10B that is a movable part provided in a so-called cantilevered manner with respect to the device main body 10A, so as to be movable relative to the device main body 10A and capable of contacting and holding the workpiece W in the stacking area TA.

The lifting unit 10B of the workpiece lifting device 10 has a function of lifting and separating, from other workpieces W, an uppermost workpiece W of the plurality of the plate-shaped workpieces W placed in the stacking area TA on the pallet P by, for example, air jet pressure or an adsorption force. In this manner, the workpiece lifting device 10 can be used as a single-sheet lifter for lifting a single sheet of workpiece W by the lifting unit 10B. However, since the detailed configuration of the single-sheet lifter is publicly known, the description thereof will be omitted. Note that in the workpiece lifting device 10 of the present embodiment, a side on which the lifting unit 10B is arranged is defined as a front side of the device.

The device main body 10A of the workpiece lifting device 10 includes a top surface part 11 provided on an upper side of the device, inclined surface parts 12 inclined from the top surface part 11 at two locations in the left and the right on the front side of the device, and a pair of side surface parts 13 connected to the top surface part 11 (and the inclined surface parts 12) on the left and right sides of the device. Markers 14, 15, and 16 are provided at predetermined locations on the top surface part 11, the inclined surface parts 12, and the pair of side surface parts 13 of the device main body 10A, each as an indicator for identifying the position and orientation of the workpiece lifting device 10.

Specifically, a plurality of the markers 14 and 16 are provided at the predetermined locations on the top surface part 11 and the pair of side surface parts 13 of the device main body 10A, and a plurality of the markers 15 are provided at the predetermined locations on the inclined surface parts 12 of the device main body 10A. More specifically, the markers 14 are provided at two locations on the left and right close to a rear side of the device on the top surface part 11 of the device main body 10A, and the markers 16 are respectively provided at locations close to the upper side of the device on the pair of side surface parts 13 of the device main body 10A. In other words, the marker 16 is provided to the side of and directly below the marker 14. Further, the markers 15 are respectively provided at locations close to both end portions in a slanted direction of the two inclined surface parts 12 of the device main body 10A.

Figure 3:
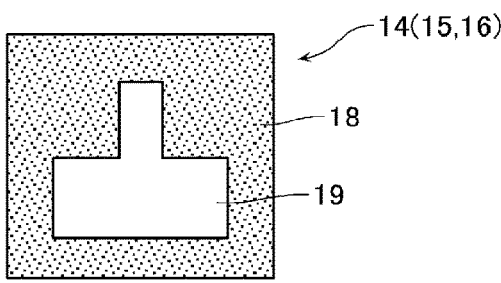
FIG. 3 is a diagram showing an example of an indicator provided on the assistance device.
Figure 4:
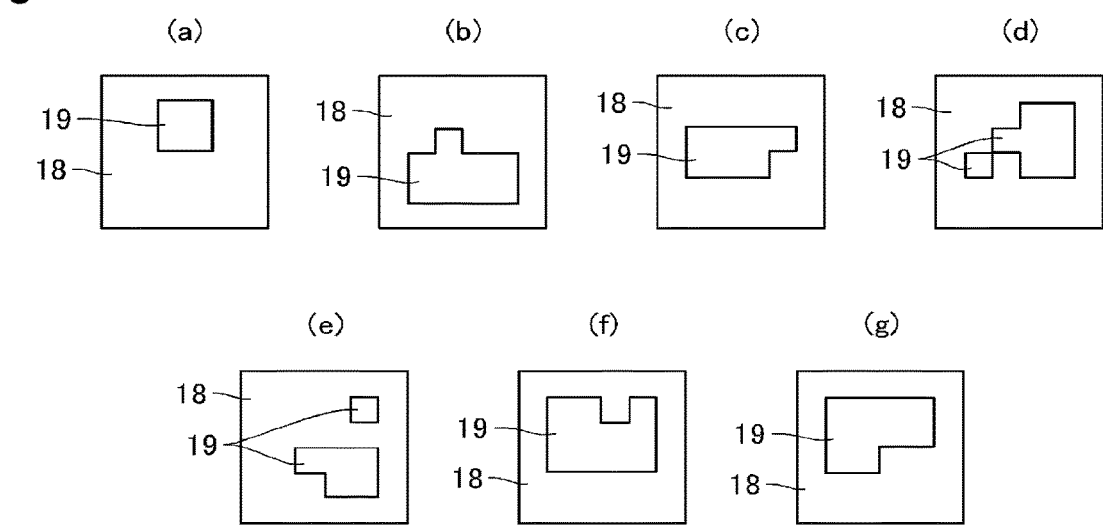
FIG. 4 is a diagram showing other examples of the indicators.

FIG. 3 is a diagram showing an example of the markers 14 to 16 provided on the workpiece lifting device 10, and FIG. 4 is a diagram showing other examples of the markers 14 to 16. The markers 14, 15, and 16 provided on the device main body 10A of the workpiece lifting device 10 can be composed of, for example, an AR (augmented reality) marker including a publicly known ArUco marker, ChArUco marker, or the like.

As shown in FIG. 3, the marker 14 (15, 16) is composed of a film-like member or a plate-shaped member including at least an entire region 18 representing the entire marker and an identification region 19 for identifying the position and the orientation by the marker. Note that in FIGS. 1 and 2, and FIG. 7 that will be described later, illustration of the identification regions 19 of the markers 14 to 16 is omitted.

In the example shown in FIG. 3, for example, the shape of the identification region 19 of the markers 14 to 16 is a shape obtained by combining simple rectangles. However, as shown in FIGS. 4(*a*) to 4(*g*), the shape is not limited to those shown in the drawings. Various shapes, such as more complex shapes and simpler shapes, can be employed as long as they can identify the position and the orientation of the workpiece lifting device 10 at least by itself by combining a plurality of rectangles and squares or changing a position of the identification region 19 in the entire region 18.

Further, the dimensions of the markers 14 to 16 (the size, shape, and the like of the entire region 18 and the identification region 19) can be set in accordance with an image capturing performance such as the number of pixels and an image capturing resolution of the camera 20. However, it is sufficient to arrange at least one marker on the top surface part 11 of the device main body 10A if the marker is the one that can be detected such that the arrangement position and the arrangement orientation of the workpiece lifting device 10 can be sufficiently determined from the captured image of the stacking area TA captured from the above. That is because the top surface part 11 is most likely to be reflected in the captured image when the workpiece lifting device 10 is in a regular arrangement state.

Further, the present embodiment is configured by respectively providing, for example, a set of markers 14 and a set of markers 15 at the plurality of locations on the top surface part 11 and the inclined surface parts 12 of the device main body 10A so that detection accuracy and recognition accuracy of the markers 14 and 15 from the captured image can be further improved. However, the configuration of the present embodiment is not limited to this.

Further, from a viewpoint of further improving the detection accuracy, it is preferable that for example, the marker 15 provided on the inclined surface part 12 of the device main body 10A is provided at a location most distant from the top surface part 11, that is, a location closest to the end portion in the slanted direction on the front side of the device. As a result, it is possible to arrange the marker 14 on the top surface part 11 and the marker 15 on the inclined surface part 12 as far apart as possible, thereby making it possible to reduce erroneous detection (or reduce a detection error).

Then, in order to make the marker 14 provided on the top surface part 11 easiest to be detected, it is preferable that both the entire region 18 and the identification region 19 are larger in size than those of the marker 15 provided on the inclined surface part 12. When the marker 14 on the top surface part 11 is large in this manner, the marker 14 can be easily detected even if the image capturing performance of the camera 20 is slightly lower than the one generally used in this field.

Note that the markers 16 provided on the pair of side surface parts 13 of the device main body 10A are provided to enable identification of the position and the orientation of the workpiece lifting device 10 (the arrangement position and the arrangement orientation at a time of overturn in the stacking area TA) even if, for example, the workpiece lifting device 10 is overturned due to some accident (for example, collision with a robot arm of the unillustrated loading machine or the like).

Then, the markers 16 are not provided on a front surface part and a back surface part connected to the pair of side surface parts 13 of the device main body 10A because due to an outer shape of the device main body 10A, there is almost no possibility that the device main body 10A stands still with the front surface part and the back surface part facing upward when the workpiece lifting device 10 is overturned. Note that obviously, the markers 16 may be provided on the front surface part and the back surface part of the device main body 10A depending on the outer shape of the device main body 10A.

Furthermore, the markers 14 to 16 may be configured to have a light transmitting property so that the entire region 18 and the identification region 19 can be satisfactory recognized even in a captured image captured in a dark environment, for example. When the markers 14 to 16 have the light transmitting property, the workpiece lifting device 10 can be configured to further include an unillustrated light source (an LED or the like) inside the device main body 10A.

With this configuration, even when lighting equipment, which will be described below, is turned off in the dark environment such as at night, the markers 14 to 16 can be made to appear in a clearly recognizable manner in the captured image if the light source inside the device main body 10A is turned on. As a result, the markers 14 to 16 of the workpiece lifting device 10 in the stacking area TA can be seen in the dark.

On the other hand, the camera 20 is configured with, for example, an inexpensive and highly versatile monocular camera (that is, a single camera), and is arranged directly above a center of the stacking area TA on the pallet P via a supporting member such as a camera stand 21 so as to be able to capture an image of the entire stacking area TA as an image capturing range. Note that although not shown, the lighting equipment including a plurality of the light emitting diodes (LEDs) or the like is provided at predetermined locations in a periphery of the pallet P to as to irradiate, with an irradiation beam, the workpieces W stacked in the stacking area TA.

When the image of the stacking area TA is captured by the camera 20, brightness of the captured image can be appropriately adjusted with proper exposure if the workpiece W is irradiated with the irradiation beam from this lighting equipment. Note that if the markers 14 to 16 configured to include the above-described light transmitting property and the light source are used, the markers 14 to 16 in the captured image can be made to appear in a sufficiently identifiable manner even in the case in which the lighting equipment described above is provided at a position at which the irradiation beam by the lighting equipment does not reach the top surface part 11 of the device main body 10A.

Figure 5:
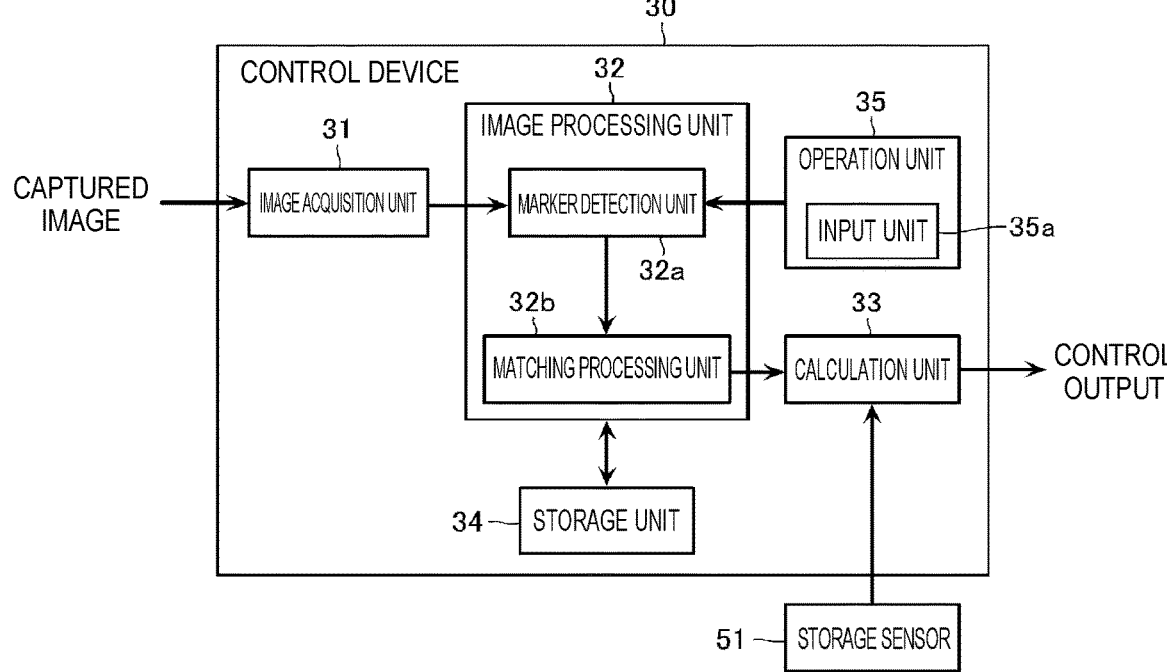
FIG. 5 is a block diagram schematically showing a functional configuration of the control device in the device determination system.
Figure 6:
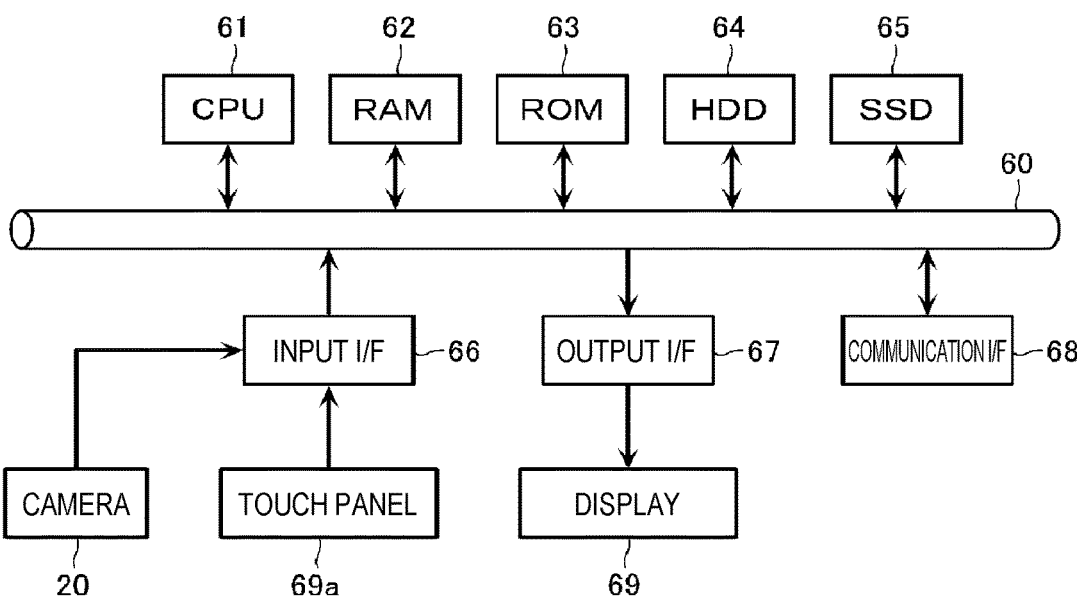
FIG. 6 is a configuration diagram schematically showing a hardware configuration of the control device.
Figure 7:
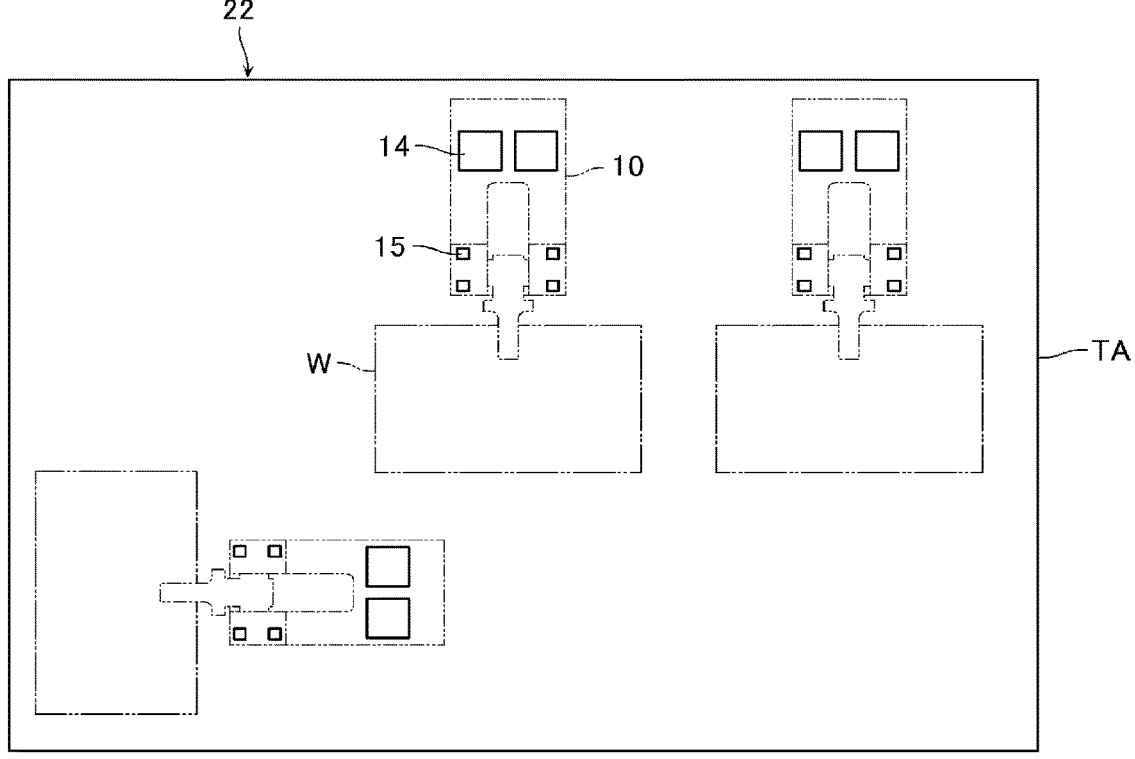
FIG. 7 is a plan view showing a picture of the indicators detected from a captured image captured by an image capturing device in the control device.

FIG. 5 is a block diagram schematically showing a functional configuration of the control device 30 in the device determination system 100, and FIG. 6 is a configuration diagram schematically showing a hardware configuration of the control device 30. Further, FIG. 7 is a plan view showing a picture of the markers 14 and 15 detected from the captured image captured by the camera 20 in the control device 30.

As shown in FIG. 5, image data of the captured image captured by the camera 20 is input to the control device 30. Functionally, the control device 30 includes an image acquisition unit 31, an image processing unit 32, a calculation unit 33, a storage unit 34, and an operation unit 35. Note that determination of the arrangement position and the arrangement orientation of the workpiece lifting device 10 in the stacking area TA (hereinafter, such processing may be referred to as the "determination processing") is mainly carried out by the image processing unit 32 of the control device 30.

Here, the image acquisition unit 31 acquires the image data of the captured image output from the camera 20. The image processing unit 32 includes, for example, a marker detection unit 32a and a matching processing unit 32b so as to execute the determination processing by carrying out various pieces of image conversion/image analysis processing including binarization processing, morphology processing, approximation processing using the Newton's method, template matching processing, and the like (hereinafter, such processing is referred to as the "image processing") to the image data acquired by the image acquisition unit 31.

Based on a determination result from the image processing unit 32, the calculation unit 33 carries out various types of calculation processing for controlling the entire device determination system 100 including the workpiece lifting device 10, so as to carry out output control to each unit. The storage unit 34 stores various types of data used in the control device 30, such as CAD data representing the workpiece W and the workpiece lifting device 10, image data of model (marker model) images that serve as references for the markers 14 to 16, and various types of program data, in a readable and writable manner.

Note that for the marker model images, a plurality of types of images corresponding to cases in which a height position and a degree of rotation of the markers 14 to 16 in the workpiece lifting device 10 are taken into consideration (for example, an image that looks tilted, an image that looks distorted, and the like) are stored as, for example, as template images. The operation unit 35 receives an operation input by a user of the control device 30 via the input unit 35a.

As shown in FIG. 6, as the hardware configuration, the control device 30 includes, for example, a CPU 61, a RAM 62, a ROM 63, an HDD (Hard Disk Drive) 64, and an SSD (Solid State Drive) 65. Further, the control device 30 includes an input I/F (interface) 66, an output I/F (interface)

67, and a communication I/F (interface) 68. The respective components 61 to 68 are connected with each other by a bus 60.

The CPU 61 controls the entire device determination system 100 including the control device 30 by executing various programs stored in the RAM 62, the ROM 63, the HDD 64, the SSD 65, and the like. The CPU 61 also achieves functions of the image processing unit 32 and the calculation unit 33 described above by executing a device determination program.

The RAM 62 can be used as a work region for the CPU 61. The ROM 63 stores the various programs described above at least in a readable manner. The HDD 64 and the SSD 65 store the various types of data described above in a readable and writable manner, and achieve a function of the storage unit 34 described above together with the RAM 62 and ROM 64.

The camera 20 is connected to the input I/F 66 to acquire the captured image. Therefore, the input I/F 66 achieves the function of the image acquisition unit 31 described above. Along with this, a touch panel 69a that functions as the input unit 35a of the operation unit 35 described above is connected to the input I/F 66 so as to receive information associated with the operation input from the user. Note that the inputting means such as the unillustrated keyboard and mouse can be connected to the input I/F 66.

For example, the display 69 of the control device 30 having the built-in touch panel 69a is connected to the output I/F 67 so as to output various pieces of information to be displayed on a monitor. Note that the control device 30 can be connected to a network such as the Internet and an external device, which are not illustrated, via the communication I/F 68.

As to the determination processing by the control device 30 configured in this manner, specifically, the marker detection unit 32a of the image processing unit 32 first detects the markers 14 and 15 provided on the top surface part 11 and the inclined surface parts 12 (or the markers 16 provided on the side surface parts 13, the same applies hereinafter) of the device main body 10A of the workpiece lifting device 10 from a captured image 22 in which the image of the stacking area TA is captured and the image processing is carried out as shown in FIG. 7, for example, by edge detection processing or the like.

Then, the image processing unit 32 stores, in the storage unit 34, position information (pixel positions) of pixels (picture elements), for example, in four corners of the markers 14 and 15 detected by the marker detection unit 32a. Here, the pixel (the picture element) refers to a minimum unit or a minimum element having color information (a color hue, gradation, and the like) when the captured image is handled by the control device 30.

Next, as to the markers 14 and 15 in the captured image 22, the image processing unit 32 obtains position models that represent actual positions of the markers 14 and 15 in the workpiece lifting device 10 based on dimension information of the respective units of the device in accordance with the CAD data stored in the storage unit 34 and the image data of the marker model images.

Then, the image processing unit 32 causes the matching processing unit 32b to improve determination accuracy by (1) applying the approximation processing of the Newton's method or the like to the position models and the pixel positions so as to calculate physical positions (x, y, z positions) and rotation states (rz) of the markers 14 and 15 in the stacking area TA, (2) generating marker images in which the physical positions (x, y, z positions) and the rotational states (rz) are reflected based on calculation results, (3) searching the markers 14 and 15 indicated by the generated marker images by carrying out, for example, the template matching processing with various marker model images stored in advance in the storage unit 34, and (4) updating the pixel positions of the markers 14 and 15 stored in the storage unit 34 based on matching information of markers indicated by the searched marker model images, that is, by repeating the processing of (1) to (4) described above a plurality of times. Then, an actual position and orientation (that is, the arrangement position and the arrangement orientation) of the workpiece lifting device 10 in the stacking area TA are determined.

As a result, it is possible to accurately grasp the arrangement positions and the arrangement orientations of the plurality of the workpiece lifting devices 10 arranged freely in the stacking area TA, for example, for each of the workpiece lifting devices 10, so as to determine an arrangement status. Therefore, it is possible to reliably carry out various types of operation control and the like in accordance with the workpiece lifting device 10 whose arrangement status is determined.

Note that since the determination processing described above is merely an example, the determination processing not limited to this. Various methods can be applied as long as the method can determine the arrangement position and the arrangement orientation in the stacking area TA by detecting the marker 14 or the like by image recognition to identify the position and the orientation of the workpiece lifting device 10.

Next, a description will be given of an operation example when, for example, the plurality of the workpiece lifting devices 10 are actually arranged in the stacking area TA and operated. In the present operation, the control device 30 is configured to include an unillustrated alarm device as issuing means capable of issuing a predetermined alarm. The alarm device is configured to be able to issue the predetermined alarm by turning on a warning light or outputting the alarm by voice.

Figure 8:
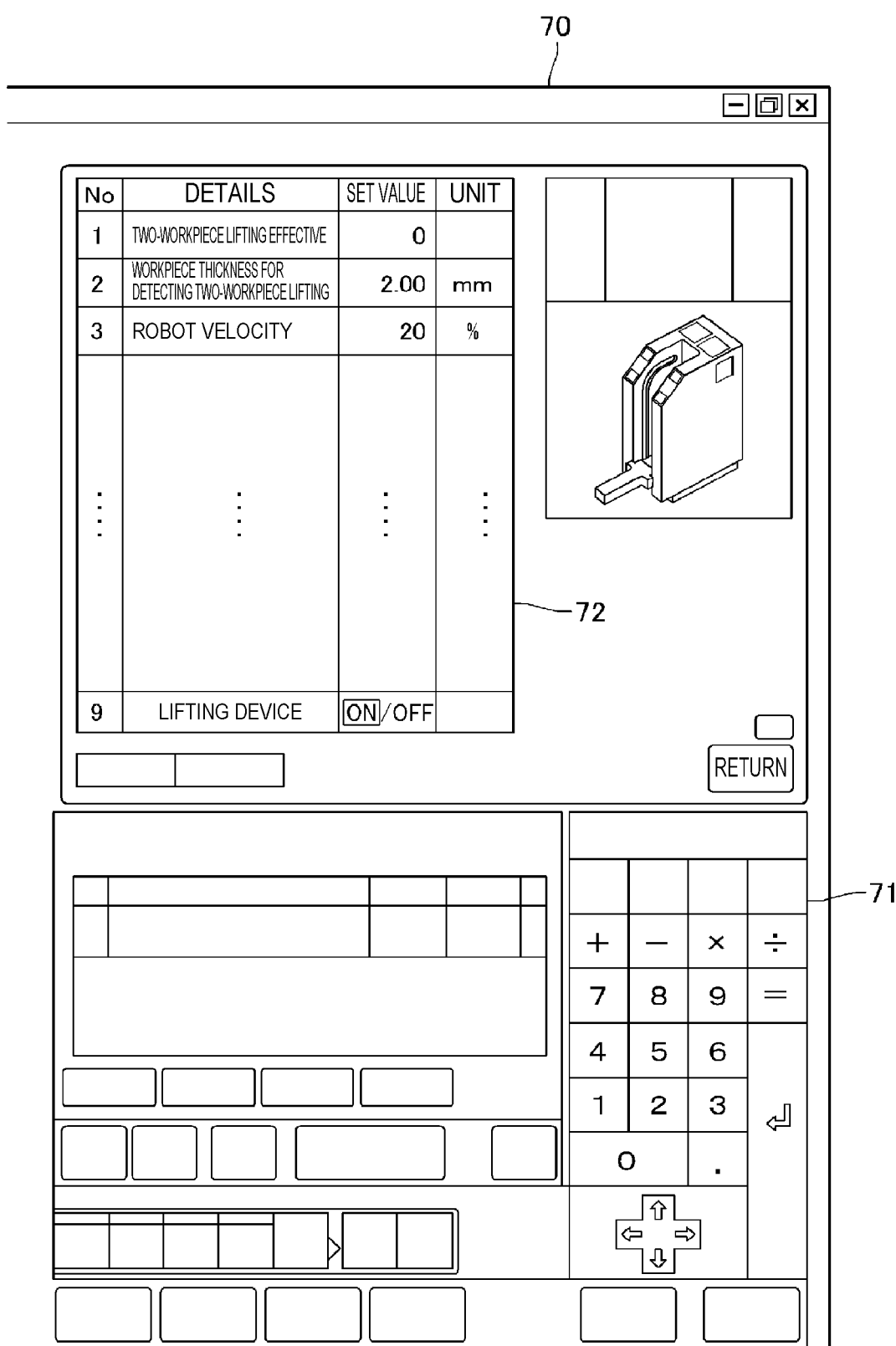
FIG. 8 is a drawing showing an example of a part of a setting screen displayed on a display of the control device.
Figure 9:
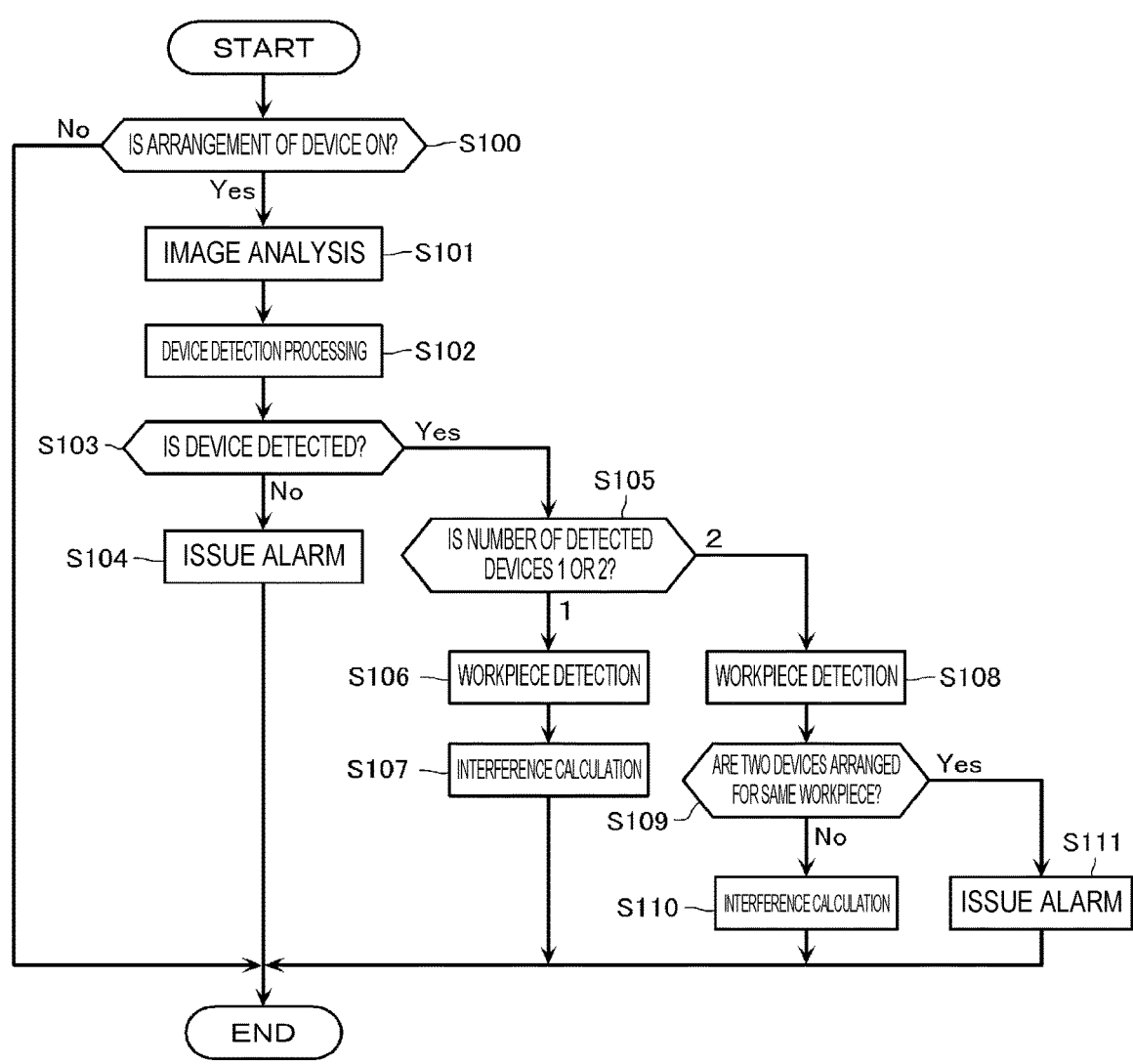
FIG. 9 is a flowchart showing an example of an operation associated with determination processing of the control device.

FIG. 8 is a drawing showing an example of a part of a setting screen displayed on the display 69 of the control device 30, and FIG. 9 is a flowchart showing an example of an operation associated with the determination processing of the control device 30. Note that here, a case will be described in which a maximum of two workpiece lifting devices 10 can be arranged and stored in either the stacking area TA or the storage area 50 in the device determination system 100.

As shown in FIG. 8, a setting screen 70 displayed on the display 69 of the control device 30 includes, for example, an operation input region 71 including numeric keys and cursor keys, and a parameter setting region 72 for setting various parameters relating to an operation of the workpiece lifting device 10. Here, when the workpiece lifting device 10 is arranged in the stacking area TA, the user operates, for example, the operation input region 71 to set a setting value of "LIFTING DEVICE" in the parameter setting region 72 to "ON". When the workpiece lifting device 10 is not arranged, the setting value described above is set to "OFF".

That is, in the present operation, as shown in FIG. 9, the control device 30 first determines whether or not the arrangement of the workpiece lifting device 10 in the stacking area TA is ON, for example, based on a setting status of the set value of "LIFTING DEVICE" described above (step S100). If it is determined that the arrangement of the device is not ON, that is, the arrangement of the device is OFF (the workpiece lifting device 10 is not arranged)

("No" in step S100), the processing of the present flowchart is terminated. However, if it is determined that the arrangement of the device is ON (that is, the workpiece lifting device 10 is arranged) ("Yes" in step S100), the following processing is executed.

That is, the captured image obtained by capturing the image of the stacking area TA with the camera 20 is first obtained and the image data is image-analyzing as described above (step S101). Then, device detection processing capable of, for example, determining the arrangement position and the arrangement orientation of each of the plurality of the workpiece lifting devices 10 is carried out by detecting the markers 14 to 16 (step S102).

Then, in the device detection processing of step S102 described above, if the device is not detected ("No" in step S103), it is assumed that there is a problem (for example, the arrangement of the device is forgotten) that the device is not actually detected though it is determined that the arrangement of the device in the stacking area TA is ON. Therefore, the alarm device is controlled to issue the alarm (step S104), and the processing according to the present flowchart is terminated.

On the other hand, if the device is detected ("Yes" in step S103), it is determined whether the number of the workpiece lifting devices 10 detected in the stacking area TA is one or two (step S105). If it is determined that the number of the detected workpiece lifting device 10 is one ("1" in step S105), image processing is carried out such as extracting an outline of the workpiece W in the stacking area TA by a line image, for example, based on the captured image, so as to detect the workpiece W in the stacking area TA (step S106).

Then, an interference calculation is carried out to determine whether or not the detected workpiece W is interfered by the workpiece lifting device 10, the robot arm, or the like whose arrangement position and arrangement orientation have been determined in step S102 described above (step S107), and the processing according to the present flowchart is terminated.

Further, if it is determined that the number of the detected workpiece lifting devices 10 is 2 ("2" in step S105), the workpiece W in the stacking area TA is detected in the same manner as in step S106 described above (step S108). Then, based on the arrangement status including the arrangement position and the arrangement orientation of each of the workpiece lifting devices 10 in the stacking area TA, which is also determined in step S102 described above, it is determined, for example, whether or not two workpiece lifting devices 10 are arranged for the same workpiece W (step S109).

If it is determined that the two workpiece lifting devices 10 are not arranged for the same workpiece W ("No" in step S109), the interference calculation for determining the presence or absence of the interference is carried out in the same manner as in step S107 described above (step S110), and the processing according to the present flowchart terminated.

On the other hand, if it is determined that the two workpiece lifting devices 10 are arranged for the same workpiece W ("Yes" in step S109), it is assumed that there is a problem in an arrangement mode thereof (such as duplicate arrangement of the devices) although the workpiece lifting device 10 should be arranged for one workpiece W in the stacking area TA in the one-to-one manner. Therefore, the alarm device is controlled to issue the alarm in the same manner as in step S104 described above (step S111), and the processing according to the present flowchart is terminated. In this manner, according to the present operation, when the workpiece lifting device 10 is arranged in the stacking area TA, it is possible to prevent the loading and the like of the workpiece W from being carried out in advance while the problem described above remains unsolved.

Figure 10:
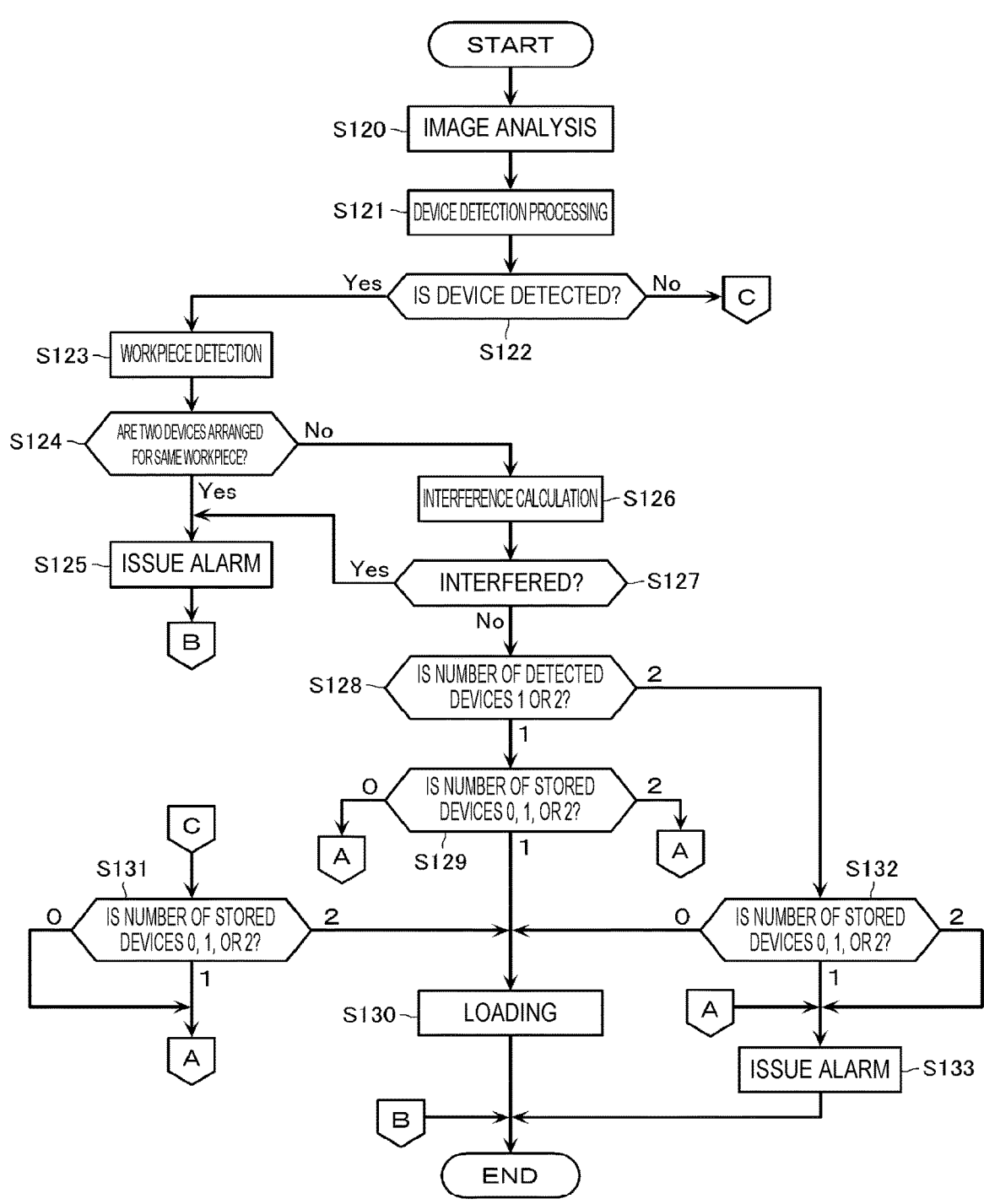
FIG. 10 is a flowchart showing another example of the operation associated with the determination processing of the control device.

FIG. 10 is a flowchart showing another example of the operation associated with the determination processing of the control device 30. Note that hereinafter, description of a part that overlaps with what have been already described will be omitted. Here, an operation based on a detected number and a stored number of the workpiece lifting devices 10 in the stacking area TA and the storage area 50, respectively, will be described.

As shown in FIG. 10, in the present operation, the control device 30 image-analyzes the captured image obtained by capturing the image of the stacking area TA with the camera 20 in the same manner as in step S101 described above (step S120). Then, the device detection processing capable of, for example, determining the arrangement position and the arrangement orientation of each of the plurality of the workpiece lifting devices 10 is carried out by detecting the markers 14 to 16 (step S121).

Then, if the device is detected in the device detection processing of step S121 described above ("Yes" in step S122), the workpiece W in the stacking area TA is detected in the same manner as in step S108 and the like described above (step S123). Then, in the same manner as in step S109 described above, it is determined whether or not the two workpiece lifting devices 10 are arranged for the same workpiece W (step S124).

If it is determined that the two workpiece lifting devices 10 are arranged for the same workpiece W ("Yes" in step S124), it is assumed that there is a problem in the arrangement mode of the workpiece lifting devices 10 as described above (the duplicated arrangement of the devices or the like). Therefore, the alarm device is controlled to issue the alarm in the same manner as in step S111 and the like described above (step S125), and the processing according to the present flowchart is terminated.

On the other hand, if it is determined that the two workpiece lifting devices 10 are not arranged for the same workpiece W ("No" in step S124), the interference calculation is carried out in the same manner as in step S110 and the like described above (step S126). If it is determined that there is interference ("Yes" in step S127), the process proceeds to step S125 described above to repeat the subsequent processing.

If it is determined that there is no interference ("No" in step S127), it is determined whether the number of the detected workpiece lifting devices 10 is one or two in the same manner as in step S125 described above (step S128). Then, if it is determined, for example, that the number of the detected workpiece lifting device 10 is one ("1" in step S127), it is determined which one from 0 to 2 is the stored number of the workpiece lifting devices 10 stored in the storage area 50 based on a detected signal from the storage sensor 51 (step S129).

Here, if it is determined that the stored number is 1 ("1" in step S129), it is possible to determine that there is no abnormality in the number of the workpiece lifting devices 10 detected in the stacking area TA and the number of the workpiece lifting devices 10 stored in the storage area 50. Therefore, it is assumed that the workpiece lifting devices 10 are appropriately arranged and managed, and the process proceeds to a loading process of the workpiece W (step S130) to terminate the processing according to the present flowchart.

On the other hand, if it is determined that the stored number is 0 or 2 ("0" or "2" in step S129), it is possible to determine that there is an abnormality in the number of the workpiece lifting devices 10 in the stacking area TA and the number of the workpiece lifting devices 10 in the storage area 50 (for example, an arrangement error, storage failure, or the like). Therefore, it is assumed that the workpiece lifting devices 10 are not appropriately arranged and managed, and the alarm device is controlled to issue the alarm in the same manner as in step S125 and the like described above (step S133), and the processing according to the present flowchart is terminated.

Further, if it is determined that the number of the detected workpiece lifting devices 10 is 2 ("2" in step S128), it is also determined which one from 0 to 2 is the stored number of the workpiece lifting devices 10 stored in the storage area 50 in the same manner as in step S129 described above (step S132).

Here, if it is determined that the stored number is 0 ("0" in step S132), it is possible to determine that there is no abnormality in the number of the workpiece lifting devices 10 in the stacking area TA and the number of the workpiece lifting device 10 in the storage area 50. Therefore, it is assumed that the workpiece lifting devices 10 are appropriately arranged and managed, and the process proceeds to step S130 described above to terminate the processing according to the present flowchart.

On the other hand, if it is determined that the stored number is 1 or 2 ("1" or "2" in step S132), it is possible to determine that there is an abnormality in the number of the workpiece lifting devices 10 in the stacking area TA and the number of the workpiece lifting devices 10 in the storage area 50. Therefore, it is assumed that the workpiece lifting devices 10 are not appropriately arranged and managed, and the process proceeds to step S133 described above to control the alarm device to issue the alarm. Then, the processing according to the present flowchart is terminated.

Note that if the device is not detected in the device detection processing of step S121 described above ("No" in step S122), it is determined which one from 0 to 2 is the stored number of the workpiece lifting devices 10 stored in the storage area 50 based on the detected signal from the storage sensor 51 (step S131).

Then, if it is determined that the stored number is 2 ("2" in step S131), it is possible to determine that there is no abnormality in the number of the workpiece lifting devices 10 in the stacking area TA and the number of the workpiece lifting devices 10 in the storage area 50. Therefore, it is assumed that the workpiece lifting devices 10 are appropriately arranged and managed, and the process proceeds to step S130 described above to terminate the processing according to the present flowchart.

On the other hand, if it is determined that the stored number is 0 or 1 ("0" or "1" in step S131), it is possible to determine that there is an abnormality in the number of the workpiece lifting devices 10 in the storage area 50. Therefore, it is assumed that the workpiece lifting devices 10 are not appropriately arranged and managed in the same manner as described above, and the process proceeds to step S133 described above to control the alarm device to issue the alarm. Then, the processing according to the flowchart is terminated.

In this manner, according to the present operation, it is possible to accurately determine the arrangement status and the storage status of the plurality of the workpiece lifting devices 10 arranged so as to be freely arranged and stored not only in the stacking area TA but also in the storage area 50. Therefore, it is possible to reliably prevent the loading and the like of the workpiece W from being carried out during the occurring problem.

Although the embodiment of the present invention has been described above, the present embodiment is presented as an example and is not intended to limit the scope of the invention. This novel embodiment can be embodied in various other modes, and various omissions, rearrangements, and modifications can be made without departing from the summary of the invention. The embodiment and modifications thereof are included in the scope and the summary of the invention, and are included in the invention described in the claims and the scope of equivalents thereof.

REFERENCE SIGNS LIST

10 Workpiece lifting device (assistance device)
10A Device main body
10B Lifting unit (movable part)
11 Top surface part
12 Inclined surface part
13 Side surface part
14, 15, 16 Markers (indicators)
18 Entire region
19 Identification region
20 Camera (image capturing device)
21 Camera stand
22 Captured image
30 Control device
50 Storage area
51 Storage sensor
100 Device determination system
P Pallet
TA Stacking area
W Workpiece

The invention claimed is:

1. A device determination system, comprising:
a working machine;
a loading machine configured to supply a workpiece stacked in a stacking area to the working machine;
an assistance device configured to assist a work of the loading machine and having portability so as to be freely arranged;
an image capturing device capable of capturing an image of the stacking area; and
a control device configured to determine an arrangement position and an arrangement orientation of the assistance device in the stacking area based on the captured image captured by the image capturing device, wherein
the assistance device includes an indicator by which a position and an orientation of the assistance device reflected in the captured image can be identified;
the control device detects the indicator included in the captured image so as to determine the arrangement position and the arrangement orientation;
the assistance device is a lifting device for lifting and separating, from other workpieces, an uppermost workpiece of a plurality of the workpieces placed in the stacking area,
a plurality of the assistance device are provided, and
the control device is configured to be capable of detecting the workpiece in the stacking area based on the captured image and execute a determining processing on whether or not the plurality of assistance device are arranged for the detected workpiece.

2. The device determination system according to claim 1, wherein the control device compares the detected indicator with an indicator indicated by an indicator model image stored in advance so as to determine the arrangement position and the arrangement orientation.

3. The device determination system according to claim 1, wherein the assistance device includes a device main body including a top surface part, and the indicator is provided on at least the top surface part of the device main body.

4. The device determination system according to claim 3, wherein the assistance device includes, on the device main body, an inclined surface part inclined from the top surface part, and the indicator is provided on the inclined surface part of the device main body.

5. The device determination system according to claim 4, wherein the indicator provided on the inclined surface part is provided at a location most distant from the top surface part.

6. The device determination system according to claim 4, wherein the indicator provided on the top surface part is larger than the indicator provided on the inclined surface part.

7. The device determination system according to claim 3, wherein the assistance device includes, on the device main body, a pair of side surface parts connected to the top surface part, and the indicator is provided on each of the pair of side surface parts of the device main body.

8. The device determination system according to claim 3, wherein the indicator has a light transmitting property, and the assistance device is provided with a light source inside the device main body.

9. The device determination system according to claim 1, wherein the control device determines an arrangement status including the arrangement position and the arrangement orientation of each of the assistance devices in the stacking area, which are determined based on the detected indicator.

10. The device determination system according to claim 9, wherein the control device specifies the assistance device to be operated for the workpiece based on a determination result of the arrangement status.

11. The device determination system according to claim 9, further comprising detecting means capable of detecting the assistance device stored in a storage area provided at a location distant from the stacking area, wherein the control device determines a storage status of the assistance device in the storage area based on a detection result from the detecting means.

12. The device determination system according to claim 11, further comprising issuing means capable of issuing a predetermined alarm, wherein the control device controls the issuing means to issue the predetermined alarm based on a determination result of the arrangement status and/or the storage status.

13. A device determination method, comprising:

capturing, by an image capturing device, an image of a stacking area provided with an assistance device configured to assist a work for a workpiece stacked in the stacking area and having portability so as to be freely arranged; and determining, by a control device, an arrangement position and an arrangement orientation of the assistance device in the stacking area based on the captured image captured by the image capturing device, wherein in the determining, an indicator by which a position and an orientation of the assistance device reflected in the captured image can be identified is detected from the captured image so as to determine the arrangement position and the arrangement orientation; and wherein the assistance device is configured to assist a work of a loading machine which supplies the workpiece stacked in the stacking area to a working machine, and is a lifting device for lifting and separating, from other workpieces, an uppermost workpiece of a plurality of the workpieces placed in the stacking area, a plurality of the assistance device are provided, and the device determination method comprises:

detecting the workpiece in the stacking area based on the captured image by the control device; and determining whether or not the plurality of assistance device are arranged for the workpiece detected through the detecting by the control device.

14. The device determination method according to claim 13, wherein in the image capturing, an image of the stacking area in which a plurality of the assistance devices are arranged is captured, and in the determining, an arrangement status including the arrangement position and the arrangement orientation of each of the assistance devices in the stacking area, which are determined based on the detected indicator, is determined.

15. The device determination method according to claim 14, further comprising detecting, by the control device, the workpiece in the stacking area based on the captured image so as to specify the assistance device to be operated for the workpiece based on a determination result of the arrangement status.

16. The device determination method according to claim 14, further comprising:

detecting, by detecting means, the assistance device stored in a storage area provided at a location distant from the stacking area; and determining, by the control device, a storage status of the assistance device in the storage area based on a detection result from the detecting means.

17. The device determination method according to claim 16, further comprising issuing a predetermined alarm by controlling issuing means capable of issuing the predetermined alarm with the control device based on a determination result of the arrangement status and/or the storage status.

18. A non-transitory computer readable medium having stored thereon a device determination program causing a computer to execute:

acquiring a captured image obtained by capturing, with an image capturing device, an image of a stacking area provided with an assistance device configured to assist a work for a workpiece stacked in the stacking area and having portability so as be freely arranged;

determining an arrangement position and an arrangement orientation of the assistance device in the stacking area based on the captured image that is acquired;

detecting the workpiece in the stacking area based on the captured image; and determining whether or not a plurality of the assistance device are arranged for the workpiece detected through the detecting, wherein in the determining, an indicator by which a position and an orientation of the assistance device reflected in the captured image can be identified is detected from the captured image so that the arrangement position and the arrangement orientation are determined; and wherein the assistance device is configured to assist a work of a loading machine which supplies the workpiece stacked in the stacking area to a working machine, and is a lifting device for lifting and separating, from other workpieces, an uppermost workpiece of a plurality of the workpieces placed in the stacking area.

* * * * *